(12) United States Patent
Wu et al.

(10) Patent No.: US 12,243,271 B2
(45) Date of Patent: Mar. 4, 2025

(54) CALIBRATION BOARD AND CALIBRATION METHOD AND SYSTEM

(71) Applicant: ORBBEC INC., Guangdong (CN)

(72) Inventors: Lihua Wu, Shenzhen (CN); Xianzhuo Liu, Shenzhen (CN); Minjian Pang, Shenzhen (CN); Zhiming Huang, Shenzhen (CN); Xiaomeng Wang, Shenzhen (CN); Jie Zeng, Shenzhen (CN); Hongfei Yang, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 422 days.

(21) Appl. No.: 17/825,404

(22) Filed: May 26, 2022

(65) Prior Publication Data
US 2022/0284630 A1 Sep. 8, 2022

Related U.S. Application Data

(63) Continuation of application No. PCT/CN2020/090925, filed on May 18, 2020.

(30) Foreign Application Priority Data

Mar. 24, 2020 (CN) .......................... 202010210792.0

(51) Int. Cl.
 G06T 7/80 (2017.01)
 G06T 7/62 (2017.01)
 H04N 17/00 (2006.01)

(52) U.S. Cl.
 CPC ............... G06T 7/80 (2017.01); G06T 7/62 (2017.01); H04N 17/002 (2013.01); G06T 2207/30244 (2013.01)

(58) Field of Classification Search
 CPC ... G06T 7/80; G06T 7/62; G06T 2207/30244; H04N 17/002
 (Continued)

(56) References Cited

U.S. PATENT DOCUMENTS

2002/0172876 A1* 11/2002 Baselmans ............ G03F 9/7076
 430/30
2010/0134516 A1* 6/2010 Cooper .................. G06T 15/04
 345/592

(Continued)

FOREIGN PATENT DOCUMENTS

CN 101698303 A 4/2010
CN 109186631 A 1/2019
(Continued)

OTHER PUBLICATIONS

PCT International Search Report and the Written Opinion mailed Dec. 21, 2020, issued in related International Application No. PCT/CN2020/090925, with partial English translation (9 pages).

(Continued)

*Primary Examiner* — Allen H Nguyen
(74) *Attorney, Agent, or Firm* — Sheppard Mullin Richter & Hampton LLP

(57) ABSTRACT

This application discloses a calibration method, a calibration system, and a calibration board. The calibration board includes checkerboard cells arranged on a surface of the calibration board, where at least one dot is arranged in each of the checkerboard cells, the dots of the calibration board include at least a first feature dot and a second feature dot, the first feature dot and the second feature dot are arranged in the checkerboard cells according to a random rule or a specific rule, and a diameter of the first feature dot is greater than a diameter of the second feature dot. The calibration board in this application improves the stability and accuracy of calibration board detection by utilizing characteristics such as a high detection accuracy and a strong anti-blur capability of a dot mark, combining with corner points of checkerboard cells.

15 Claims, 2 Drawing Sheets

(58) Field of Classification Search
USPC .......................................................... 382/181
See application file for complete search history.

(56) References Cited

U.S. PATENT DOCUMENTS

| | | | |
|---|---|---|---|
| 2010/0134688 A1* | 6/2010 | Moriwake ............. | G06T 15/506 |
| | | | 345/426 |
| 2019/0147609 A1* | 5/2019 | Lohry .................... | G06V 20/64 |
| | | | 382/154 |
| 2019/0320166 A1* | 10/2019 | Forster ..................... | G06T 7/80 |
| 2020/0408510 A1* | 12/2020 | Drouin ................. | G01B 11/002 |

FOREIGN PATENT DOCUMENTS

| | | |
|---|---|---|
| CN | 109285194 A | 1/2019 |
| CN | 109532021 A | 3/2019 |
| CN | 110490940 A | 11/2019 |
| CN | 110570354 A | 12/2019 |
| CN | 110599548 A | 12/2019 |
| CN | 110660107 A | 1/2020 |

OTHER PUBLICATIONS

First Search and Office Action dated Apr. 7, 2024, issued in related Chinese Patent Application No. 202010210792.0, with English machine translation (11 pages).

PCT International Preliminary Report on Patentability mailed Oct. 6, 2022, issued in related International Application No. PCT/CN2020/090925, with English translation (9 pages).

* cited by examiner $$\begin{bmatrix} -1 & 1 & 1 & 1 & -1 \\ 1 & 1 & 1 & 1 & -1 \\ 1 & 1 & 1 & 1 & 1 \\ -1 & 1 & 1 & 1 & -1 \\ -1 & 1 & -1 & 1 & 1 \end{bmatrix}$$

(a)

$$\begin{bmatrix} -1 & 1 & 0 & 1 & -1 \\ 1 & 0 & 1 & 0 & -1 \\ 1 & 1 & 0 & 1 & 1 \\ -1 & 1 & 0 & 0 & -1 \\ -1 & 1 & -1 & 1 & 1 \end{bmatrix}$$

(b)

CALIBRATION BOARD AND CALIBRATION METHOD AND SYSTEM

CROSS-REFERENCE TO RELATED APPLICATIONS

This application is a Continuation Application of International Patent Application No. PCT/CN2020/090925, filed on May 18, 2020, which is based on and claims priority to and benefits of Chinese Patent Application No.202010210792.0, filed on Mar. 24, 2020. The entire content of all of the above identified applications is incorporated herein by reference.

TECHNICAL FIELD

This application relates to the fields of image processing, computer vision, and camera calibration technologies, and in particular, to a calibration board and a calibration method and system.

BACKGROUND

Calibration boards are widely applied to fields such as machine vision, image measurement, photogrammetry, and three-dimensional (3D) reconstruction. An image of a calibration board with a fixed-pitch pattern array is captured by a camera, and through calculation using a calibration algorithm, a geometric model of the camera can be obtained, thereby obtaining a high-precision measurement and reconstruction result.

At present, a checkerboard is relatively widely used in a process of camera calibration. However, such a checkerboard has no directivity and cannot be blocked, which requires that an imaged captured by a camera during calibration needs to include the whole checkerboard, and all corner points on the checkerboard can be detected. Otherwise, data acquired by the calibrated camera is invalid. However, in a calibration process using an existing improved ChArUco calibration board, the accuracy of positions of corner points is not high. Further, if a focal length of a camera is reduced, an acquired image is blurred, which is likely to cause a failure in detecting the corner points.

The foregoing content disclosed in BACKGROUND is only used to assist in understanding the concepts and technical solutions of this application, but does not necessarily belong to existing technologies of this application. In the absence of clear evidence that the foregoing content has been disclosed on the filing date of this application, BACKGROUND should not be used to evaluate novelty and inventiveness of this application.

SUMMARY

This application provides a calibration board and a calibration method and system, to resolve at least one of the foregoing problems in BACKGROUND.

The technical solutions in the embodiments of this application are implemented as follows.

A calibration board is provided, including checkerboard cells arranged on a surface of the calibration board, where
  at least one dot is arranged in each of the checkerboard cells; and
  the dots of the checkerboard cells comprise at least a first feature dot and a second feature dot, the first feature dot and the second feature dot are arranged on the checkerboard cells according to a random rule or a specific rule, and a diameter of the first feature dot is greater than a diameter of the second feature dot.

In some embodiments, centers of the first feature dot and the second feature dot are centroids, a centroid of a feature dot is perspective invariant, and centroids of feature dots with different diameters have positioning information of the checkerboard cells.

In some embodiments, the checkerboard cells include black and white grids arranged alternately, where intersections of the black grids are corner points of the checkerboard cells.

Another technical solution of the embodiments of this application is as follows.

A calibration method is provided, including the following steps:
  S1: obtaining a calibration image of a calibration board captured by a camera, wherein the calibration board comprises checkerboard cells arranged on a surface of the calibration board, and at least one dot is arranged in each of the checkerboard cells; and the dots of the checkerboard cells comprise at least a first feature dot and a second feature dot, and a diameter of the first feature dot is greater than a diameter of the second feature dot;
  S2: determining a position of the calibration board in the calibration image and detecting dots on the calibration board;
  S3: gridding the detected dots based on the checkerboard cells to obtain a first two-dimensional matrix;
  S4: determining types of the detected dots, binarizing the detected dots based on the first two-dimensional matrix according to the types of the detected dots, to obtain a second two-dimensional matrix;
  S5: matching the second two-dimensional matrix with a calibration board number template matrix, to obtain dot-centroid coordinate number information of the second two-dimensional matrix; and
  S6: outputting, according to the obtained dot-centroid coordinate number information obtained in step S5, corner-point number information corresponding to the checkerboard cells in which the obtained dots are located, and calculating calibration data according to the dot-centroid coordinate number information, the checkerboard corner-point number information, and a corresponding camera model by using a preset calibration algorithm.

In some embodiments, in step S1, the calibration board is placed in a field of view of the camera, and imaging processing is performed by using the camera at a plurality of distances between the camera and the calibration board, to obtain a plurality of calibration images of the calibration board.

In some embodiments, in step S3, all detected dots that meet a requirement are connected based on the checkerboard cells to form grids to obtain the first two-dimensional matrix according to the grids.

In some embodiments, in step S4, diameters of detected dots that meet a requirement are determined based on the first two-dimensional matrix, where if a first detected dot meeting the requirement is a first feature dot, a value at a position corresponding to the first detected dot meeting the requirement in the first two-dimensional matrix is not changed, and the value of the first detected dot meeting the requirement in the first two-dimensional matrix is mapped into the second two-dimensional matrix to generate the second two-dimensional matrix; and if a second detected dot meeting the requirement is a second feature dot, a value at a position corresponding to the second detected dot meeting the requirement in the first two-dimensional matrix is changed, and the changed value of the second detected dot meeting the requirement in the first two-dimensional matrix is mapped into the second two-dimensional matrix to generate the second two-dimensional matrix.

In some embodiments, in step S5, a size and a dot arrangement of the calibration board number template are the same as a size and a dot arrangement of the calibration board used for obtaining the calibration image.

In some embodiments, in step S5, the second two-dimensional matrix is sequentially traversed, and is matched with the calibration board number template matrix; and if the second two-dimensional matrix matches with the calibration board number template matrix, position information of centroids of the detected dots is outputted according to position information of centroids of dots on the calibration board number template.

Another technical solution of the embodiments of this application is as follows:

A calibration system is provided, including the calibration board according to the foregoing technical solutions, a camera, a processor, and a memory, where the camera is configured to capture a calibration image of the calibration board;

the memory is configured to store executable instructions for performing a calibration method; and the processor is configured to read the executable instructions from the memory, and calibrate a corresponding camera model by using the calibration image, to obtain calibration data.

The technical solutions provided in this application have the following beneficial effects.

The calibration board in this application improves the stability and accuracy of calibration board detection by utilizing characteristics such as a high detection accuracy and a strong anti-blur capability of a dot mark and combining with corner points of checkerboard cells. Even if the calibration board is partially blocked or exceeds a field of view of a camera, camera calibration can still be performed normally, leading to more flexible image acquisition for calibration. In addition, the calibration board is also suitable for evaluating and verifying a calibration result and performance. Through obtained calibration data and an obtained camera model, accuracy of the calibration data is evaluated by using indicators such as a reprojection error and calibration board reconstruction.

BRIEF DESCRIPTION OF THE DRAWINGS

To describe the technical solutions in the embodiments of this application or in existing technologies more clearly, the following briefly describes the accompanying drawings required for describing the embodiments or the existing technologies. Apparently, the accompanying drawings in the following description show merely some embodiments of this application, and a person of ordinary skill in the art may still derive other drawings from these accompanying drawings without creative efforts.

DETAILED DESCRIPTION

To make the technical problems to be resolved by embodiments of this application, and the technical solutions and beneficial effects of the embodiments of this application clearer and more comprehensible, the following further describes this application in detail with reference to the accompanying drawings and embodiments. It should be understood that the specific embodiments described herein are merely used for explaining this application but are not intended to limit this application.

It should be noted that, when an element is described as being "fixed on" or "disposed on" another element, the element may be directly located on the another element, or indirectly located on the another element. When an element is described as being "connected to" another element, the element may be directly connected to the another element, or indirectly connected to the another element. In addition, the connection may be used for fixation or circuit connection.

It should be understood that orientation or position relationships indicated by terms such as "length," "width," "above," "below," "front," "back," "left," "right," "vertical," "horizontal" "top," "bottom," "inside," and "outside" are based on orientation or position relationships shown in the accompanying drawings, and are used only for ease and brevity of illustration and description of the embodiments of this application, rather than indicating or implying that the mentioned apparatus or element needs to have a particular orientation or needs to be constructed and operated in a particular orientation. Therefore, such terms should not be construed as limiting this application.

In addition, terms "first" and "second" are used merely for the purpose of description, and shall not be construed as indicating or implying relative importance or implying a quantity of indicated technical features. In view of this, a feature defined by "first" or "second" may explicitly or implicitly include one or more features. In the descriptions of the embodiments of this application, unless otherwise specified, "a plurality of" means two or more than two.

Figure 1:
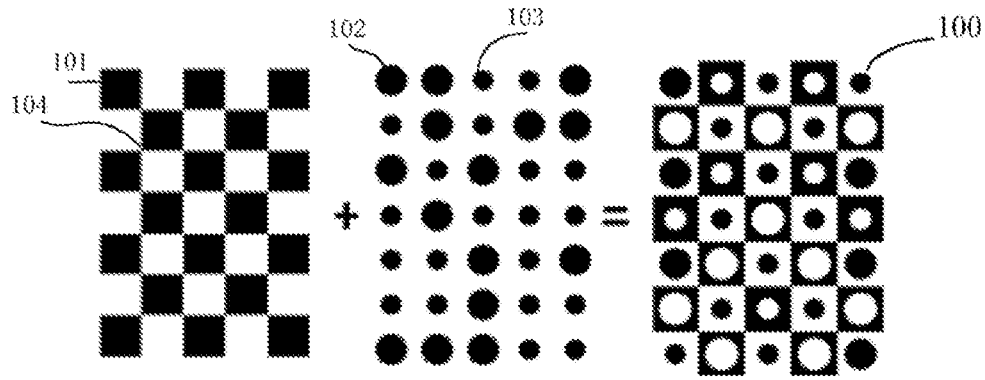
FIG. 1 is a schematic structural diagram of a calibration board according to an embodiment of this application.

FIG. 1 is a schematic structural diagram of a calibration board according to an embodiment of this application. Checkerboard cells 101 are arranged on a surface of a calibration board 100, and at least one dot is individually arranged in each of the checkerboard cells 101. The dots include at least a first feature dot 102 and a second feature dot 103. The first feature dot 102 and the second feature dot 103 are arranged on a checkerboard according to a random rule or a specific rule. A diameter of the first feature dot 102 is greater than a diameter of the second feature dot 103. It should be understood that the dots may include three or more types of feature dots. The different types of feature dots have different diameters. Descriptions are made in this application by merely using two types of feature dots with different diameters. This is not limited herein.

In an embodiment, the checkerboard cells 101 include black and white square grids arranged alternately. Intersections of black grids are corner points 104 of the checkerboard cells 101. Centers of the first feature dot 102 and the second feature dot 103 are centroids. A centroid of a feature dot is perspective invariant, and centroids of feature dots with different diameters have positioning information of the checkerboard cells 101. For example, processing, such as binary encoding, is performed on the dots, the first feature dot is 1, and the second feature dot is 0. In this case, a local region on the calibration board is equivalent to a two-dimensional barcode, so that the calibration board 100 has directivity, and has a feature of allowing a partial view to be blocked during application. It should be understood that specific colors of the checkerboard are not particularly limited in this embodiment, provided that a color contrast between a checkerboard cell and an adjacent cell is greater than a particular preset threshold. The preset threshold may be customized according to the intensity of the contrast provided that the preset threshold meets a camera calibration requirement.

In this embodiment of this application, the stability and accuracy of calibration board detection are improved by utilizing characteristics such as a high detection accuracy and a strong anti-blur capability of a dot mark and combining with corner points of checkerboard cells. Even if the calibration board is partially blocked or exceeds a field of view of a camera, camera calibration can still be performed normally, leading to more flexible image acquisition for calibration. In addition, the calibration board is also suitable for evaluating and verifying a calibration result and performance. Through obtained calibration data and an obtained camera model, the accuracy of the calibration data is evaluated by using indicators such as a reprojection error and calibration board reconstruction.

Figure 2:
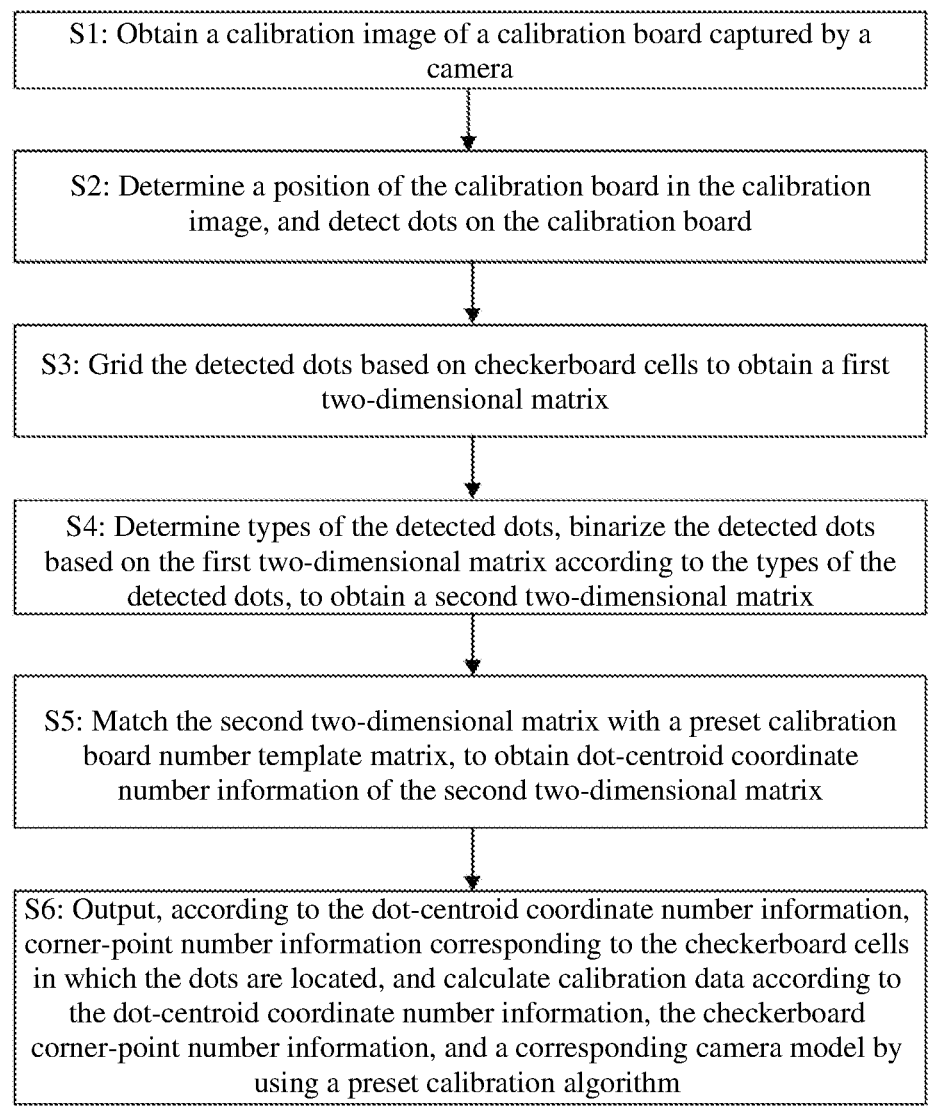
FIG. 2 is a flowchart of a calibration method according to an embodiment of this application.

FIG. 2 is a flowchart of a calibration method provided based on the calibration board 100 in the foregoing embodiment. The method includes the following steps:

S1: Obtain a calibration image that is captured by a camera and that includes the calibration board in the foregoing embodiment;

S2: Determine a position of the calibration board in the calibration image and detect dots on the calibration board;

S3: Gridding the detected dots based on the checkerboard cells to obtain a first two-dimensional matrix;

S4: Determining types of the detected dots, binarize the detected dots based on the first two-dimensional matrix according to the types of the detected dots, to obtain a second two-dimensional matrix;

S5: Match the second two-dimensional matrix with a preset calibration board number template matrix, to obtain dot-centroid coordinate number information of the second two-dimensional matrix; and S6: outputting, according to the dot-centroid coordinate number information obtained in step S5, corner-point number information corresponding to the checkerboard cells in which the dots are located, and calculating calibration data according to the dot-centroid coordinate number information, the checkerboard corner-point number information, and a corresponding camera model by using a preset calibration algorithm.

Specifically, in step S1, the calibration board is placed in a field of view of the camera, and imaging processing is performed at a plurality of preset distances between the camera and the calibration board by using the camera, to obtain a plurality of calibration images including the calibration board. In an embodiment, directions of the calibration board or the camera and a distance between the calibration board and the camera may be adjusted to obtain a plurality of calibration images with rich coordinate information by using the camera at different positions, different angles, and different postures. The calibration image may be a complete calibration board image or an incomplete calibration board image. It can be understood that, the camera in this embodiment may alternatively be another imaging device such as a video camera or a webcam, or may be an independent imaging device or a plurality of imaging devices arranged side by side provided that the calibration board is located in a field of view of each of the plurality of imaging devices. The type and quantity of imaging devices are not limited in the embodiments of this application.

In step S2, a position of the calibration board in the calibration image is random, and a size of the calibration board in the calibration image varies with a distance from the position. Therefore, it is necessary to determine the position of the calibration board in the calibration image before detecting the dots on the calibration board. Positions and centroids of the dots on the calibration board in the calibration image are detected by using a Hough transform circle detection algorithm.

Figures 3, 4:
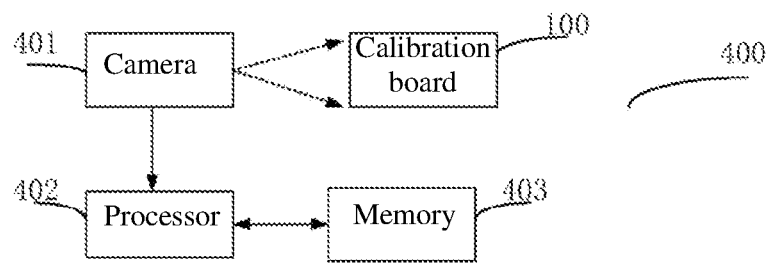
FIG. 3 is a schematic diagram of a two-dimensional matrix of a calibration method according to an embodiment of this application.
FIG. 4 is a schematic diagram of a calibration system according to an embodiment of this application.

In step S3, all detected dots that meet a preset requirement are connected based on the checkerboard cells to form grids to obtain the first two-dimensional matrix. As shown in FIG. 3(*a*), centroids are checked in the grids based on the checkerboard cells. If a centroid is detected, a corresponding position in the first two-dimensional matrix is represented by a value of 1. If no centroid is detected in a grid based on the checkerboard cells, a corresponding position in the first two-dimensional matrix is represented by a value of −1. It should be understood that results of centroid detection may alternatively be represented by other values in the first two-dimensional matrix provided that whether a centroid exists in a current grid is indicated. This is not limited herein.

In step S4, diameters of detected dots that meet a requirement are determined based on the first two-dimensional matrix obtained in step S3. The detected dots are classified/determined into different types of dots including, but not limited to, first feature dots and second feature dots according to the diameters of the dots. Different types of dots may have different diameters. A diameter of a first feature dot is greater than a diameter of a second feature dot. If a detected dot is determined as a first feature dot, a value of a corresponding position in the first two-dimensional matrix is not changed and remains 1. If a detected dot is determined as a second feature dot, a value of a corresponding position in the first two-dimensional matrix is changed to 0. In this way, a second two-dimensional matrix shown in FIG. 3(B) can be obtained. It should be understood that other values may be used to replace values of corresponding positions in the first two-dimensional matrix to change, provided that is changed of the values in the current first two-dimensional matrix are indicated. This is not limited herein.

In step S5, the second two-dimensional matrix is matched with the preset calibration board number template matrix. A size and a dot arrangement of a preset calibration board number template are the same as those of the calibration board used for obtaining the calibration image. Further, in addition to number information of each dot (such as (1, 2) or (2, 3)), the calibration board number template also includes information such as checkerboard corner points, a checkerboard size, and positions of centroids of dots. The second two-dimensional matrix is sequentially traversed, and is matched with the preset calibration board number template matrix. A direction of the calibration board may be calibrated according to a position relationship between the centroids of the dots. Position information of the centroids of the detected dots in the rest checkerboard cells in the calibration image is gradually matched in a diffusion manner. If the matching between the second two-dimensional matrix and the preset calibration board number template matrix succeeds, position information of the centroids of the detected dots is outputted according to position information of centroids of dots on the preset calibration board number template.

In step S6, the corner-point number information corresponding to the checkerboard cells in which the dots are located is outputted according to the dot-centroid coordinate number information obtained in step S5, and the calibration data, such as internal and external parameters and a lens distortion coefficient of the camera, is calculated according to the dot-centroid coordinate number information, the checkerboard corner-point number information, and the corresponding camera model (such as a pinhole model) by using the preset calibration algorithm.

FIG. 4 shows a calibration system provided based on the calibration method in the foregoing embodiment according to another embodiment of this application. A system 400 includes a camera 401, a processor 402, a memory 403, and the calibration board 100 in the foregoing embodiment. The camera 401 is configured to capture a calibration image including the calibration board 100. The processor 402 is configured to read executable instructions of the calibration method from the memory, calibrate a corresponding camera model by using the calibration image, obtain calibration data, and then upload the calibration data to the memory 403 for storage. The memory 403 is configured to store the executable instructions of the foregoing calibration method and store the calibration data obtained by the processor 402. In some embodiments, the camera is controlled to acquire images of the calibration board at a plurality of preset distances, to obtain a plurality of calibration images. In some embodiments, the calibration data calculated by the processor includes an internal parameter matrix, an external parameter matrix, and a distortion parameter.

The embodiments of this application further provide a storage medium configured to store a computer program. The computer program, when executed, performs at least the calibration method as described above.

The storage medium may be implemented by using any type of volatile or non-volatile storage device or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM), and the magnetic surface memory may be a magnetic disk memory or a magnetic tape memory. The volatile memory may be a random access memory (RAM), used as an external cache. Through exemplary but non-limitative descriptions, RAMs in lots of forms may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a SyncLink dynamic random access memory (SLDRAM), and a direct Rambus random access memory (DRRAM). The storage medium described in this embodiment of this application is intended to include but is not limited to these memories and any other memory of a suitable type.

It can be understood that, the foregoing content further describes this application in detail with reference to specific or exemplary implementations, and it should not be considered that the specific implementation of this application is limited to these descriptions. A person of ordinary skill in the art, to which this application belong, may make various replacements or variations on the described implementations without departing from the principle of this application, and the replacements or variations should fall within the protection scope of this application. In the descriptions of this application, descriptions using reference terms such as "one embodiment," "some embodiments," "exemplary embodiment," "example," "specific example" or "some examples" means including specific features, structures, materials, or features described in the embodiment or example in at least one embodiment or example of this application.

In the specification, schematic representations of the above terms are not necessarily directed to the same embodiments or examples. Moreover, the specific features, structures, materials, or characteristics described may be combined in any one or more embodiments or examples in a suitable manner. In addition, different embodiments or examples described in the specification, as well as features of different embodiments or examples, may be integrated and combined by those skilled in the art without contradicting each other. Although embodiments of this application and advantages thereof have been described in detail, it should be understood that various changes, substitutions, and alterations can be made herein without departing from the scope defined by the appended claims.

In addition, the scope of this application is not limited to processes, machines, manufacturing, material composition, means, methods, and steps in a specific embodiment in this specification. A person of ordinary skill in the art can easily understand and use the above disclosures, processes, machines, manufacturing, material composition, means, methods, and steps that currently exist or will be developed later and that perform substantially the same functions as the corresponding embodiments described herein or obtain substantially the same results as the embodiments described herein. Therefore, the appended claims intend to include such processes, machines, manufacturing, material compositions, means, methods, or steps within the scope thereof.

What is claimed is:

1. A calibration method, comprising:
   obtaining a calibration image of a calibration board captured by a camera, wherein the calibration board comprises checkerboard cells arranged on a surface of the calibration board, and at least one dot is arranged in each of the checkerboard cells, and the dots of the checkerboard cells comprise at least a first feature dot and a second feature dot, and a diameter of the first feature dot is greater than a diameter of the second feature dot;
   determining a position of the calibration board in the calibration image, and detecting dots on the calibration board;
   gridding the detected dots based on the checkerboard cells to obtain a first two-dimensional matrix;
   determining types of the detected dots, binarizing the detected dots based on the first two-dimensional matrix according to the types of the detected dots, to obtain a second two-dimensional matrix;
   matching the second two-dimensional matrix with a calibration board number template matrix, to obtain dot-centroid coordinate number information of the second two-dimensional matrix; and
   outputting, according to the obtained dot-centroid coordinate number information, corner-point number information corresponding to the checkerboard cells in which the detected dots are located, and calculating calibration data, according to the dot-centroid coordinate number information, the corner-point number information, and a corresponding camera model, by using a calibration algorithm.

2. The calibration method according to claim 1, wherein the obtaining the calibration image of the calibration board comprises:
placing the calibration board in a field of view of the camera, and imaging, by the camera, the calibration board at a plurality of distances between the camera and the calibration board, to obtain a plurality of calibration images of the calibration board.

3. The calibration method according to claim 1, wherein the gridding the detected dots comprises:
connecting all detected dots that meet a requirement based on the checkerboard cells to form grids to obtain the first two-dimensional matrix according to the grids.

4. The calibration method according to claim 1, wherein the obtaining the second two-dimensional matrix comprises:
determining diameters of detected dots that meet a requirement based on the first two-dimensional matrix, wherein
if a first detected dot meeting the requirement is the first feature dot, a value at a position corresponding to the first detected dot meeting the requirement in the first two-dimensional matrix is not changed, and the value of the first detected dot meeting the requirement in the first two-dimensional matrix is mapped into the second two-dimensional matrix to generate the second two-dimensional matrix, and
if a second detected dot meeting the requirement is the second feature dot, a value at a position corresponding to the second detected dot meeting the requirement in the first two-dimensional matrix is changed, and the changed value of the second detected dot meeting the requirement in the first two-dimensional matrix is mapped into the second two-dimensional matrix to generate the second two-dimensional matrix.

5. The calibration method according to claim 1, wherein a size and a dot arrangement of a calibration board number template are the same as a size and a dot arrangement of the calibration board used for obtaining the calibration image.

6. The calibration method according to claim 1, wherein the matching the second two-dimensional matrix with the calibration board number template matrix comprises:
traversing the second two-dimensional matrix sequentially, and matching the second two-dimensional matrix with the calibration board number template matrix, and
if the second two-dimensional matrix matches with the calibration board number template matrix, outputting position information of centroids of the detected dots according to position information of centroids of dots on a calibration board number template.

7. A calibration system, comprising a calibration board, a camera, a processor, and a memory, wherein
the camera is configured to capture a calibration image of the calibration board;
the calibration board comprises:
checkerboard cells arranged on a surface of the calibration board, wherein at least one dot is arranged in each of the checkerboard cells, and the dots of the checkerboard cells comprise at least a first feature dot and a second feature dot, and a diameter of the first feature dot is greater than a diameter of the second feature dot; and
the memory is configured to store executable instructions, and the processor is configured to read the executable instructions from the memory to perform operations comprising:
obtaining the calibration image of the calibration board captured by the camera;
determining a position of the calibration board in the calibration image, and detecting dots on the calibration board;
gridding the detected dots based on the checkerboard cells, and obtaining a first two-dimensional matrix;
determining types of the detected dots, binarizing the detected dots based on the first two-dimensional matrix according to the types of the detected dots to obtain a second two-dimensional matrix;
matching the second two-dimensional matrix with a calibration board number template matrix to obtain dot-centroid coordinate number information of the second two-dimensional matrix; and
outputting, according to the obtained dot-centroid coordinate number information, corner-point number information corresponding to the checkerboard cells in which the detected dots are located, and calculating calibration data, according to the dot-centroid coordinate number information, the corner-point number information, and a corresponding camera model, by using a calibration algorithm.

8. The calibration system according to claim 7, wherein the obtaining the calibration image of the calibration board comprises:
placing the calibration board in a field of view of the camera, and imaging, by the camera, the calibration board at a plurality of distances between the camera and the calibration board, to obtain a plurality of calibration images of the calibration board.

9. The calibration system according to claim 7, wherein the gridding the detected dots comprises:
connecting all detected dots that meet a requirement based on the checkerboard cells to form grids to obtain the first two-dimensional matrix according to the grids.

10. The calibration system according to claim 7, wherein the obtaining the second two-dimensional matrix comprises:
determining diameters of detected dots that meet a requirement based on the first two-dimensional matrix, wherein
if a first detected dot meeting the requirement is the first feature dot, a value at a position corresponding to the first detected dot meeting the requirement in the first two-dimensional matrix is not changed, and the value of the first detected dot meeting the requirement in the first two-dimensional matrix is mapped into the second two-dimensional matrix to generate the second two-dimensional matrix, and
if a second detected dot meeting the requirement is the second feature dot, the value at the position corresponding to the second detected dot meeting the requirement in the first two-dimensional matrix is changed, and the changed value of the second detected dot meeting the requirement in the first two-dimensional matrix is mapped into the second two-dimensional matrix to generate the second two-dimensional matrix.

11. The calibration system according to claim 7, wherein a size and a dot arrangement of a calibration board number template are the same as a size and a dot arrangement of the calibration board used for obtaining the calibration image.

12. The calibration system according to claim 7, wherein the matching the second two-dimensional matrix with the calibration board number template matrix comprises:
- traversing the second two-dimensional matrix sequentially, and matching the second two-dimensional matrix with the calibration board number template matrix, and
- if the second two-dimensional matrix matches with the calibration board number template matrix, outputting position information of centroids of the detected dots according to position information of centroids of dots on a calibration board number template.

13. The calibration system according to claim 7, wherein a center of the first feature dot and a center of the second feature dot are centroids, and the centroids have positioning information of the checkerboard cells.

14. The calibration system according to claim 7, wherein the checkerboard cells comprise black grids and white grids arranged alternately, wherein intersections of the black grids are corner points of the checkerboard cells.

15. The calibration system according to claim 7, wherein the first feature dot and the second feature dot are arranged in the checkerboard cells according to a random rule or a specific rule.

\* \* \* \* \*